US009372318B2

(12) United States Patent
Veatch et al.

(10) Patent No.: US 9,372,318 B2
(45) Date of Patent: Jun. 21, 2016

(54) RACK MOUNTABLE OPTICAL FIBER ENCLOSURE

(71) Applicant: The Siemon Company, Watertown, CT (US)

(72) Inventors: Anthony Veatch, Morris, CT (US); David Hunkins, Thomaston, CT (US); Charles Maynard, Watertown, CT (US); David Medeiros, Watertown, CT (US); Scott Nagel, Trumbull, CT (US)

(73) Assignee: THE SIEMON COMPANY, Watertown, CT (US)

( * ) Notice: Subject to any disclaimer, the term of this patent is extended or adjusted under 35 U.S.C. 154(b) by 0 days.

(21) Appl. No.: 14/612,407

(22) Filed: Feb. 3, 2015

(65) Prior Publication Data

US 2015/0219866 A1    Aug. 6, 2015

Related U.S. Application Data

(60) Provisional application No. 61/934,932, filed on Feb. 3, 2014.

(51) Int. Cl.
*G02B 6/00* (2006.01)
*G02B 6/44* (2006.01)

(52) U.S. Cl.
CPC .............. *G02B 6/445* (2013.01); *G02B 6/4441* (2013.01); *G02B 6/4452* (2013.01); *G02B 6/4453* (2013.01)

(58) Field of Classification Search
CPC ...... G02B 6/444; G02B 6/4441; G02B 6/445; G02B 6/4453
USPC ................................... 385/135–137
See application file for complete search history.

(56) References Cited

U.S. PATENT DOCUMENTS

| 5,127,082 | A | 6/1992 | Below et al. | |
|---|---|---|---|---|
| 5,412,751 | A | 5/1995 | Siemon et al. | |
| 5,898,129 | A | 4/1999 | Ott et al. | |
| 2010/0054682 | A1* | 3/2010 | Cooke | G02B 6/4455 385/135 |
| 2010/0322578 | A1* | 12/2010 | Cooke | G02B 6/4471 385/135 |
| 2012/0114295 | A1* | 5/2012 | Guzzo | G02B 6/4452 385/135 |
| 2013/0077927 | A1* | 3/2013 | O'Connor | G02B 6/4452 385/135 |

OTHER PUBLICATIONS

International Search Report for application PCT/US15/12868, dated Apr. 9, 2015, 7 pages.

* cited by examiner

*Primary Examiner* — Ryan Lepisto
(74) *Attorney, Agent, or Firm* — Cantor Colburn LLP

(57) ABSTRACT

An optical fiber enclosure includes a generally rectangular housing including mounting tabs, the mounting tabs to secure the optical fiber enclosure to a rack; a plurality of trays slidable relative to the housing, the plurality of trays extendable from a front side of the housing; and a plurality of cable management clips along a front edge of a tray of the plurality of trays, the cable management clips arranged to retain optical fiber cables entering the enclosure.

15 Claims, 10 Drawing Sheets

RACK MOUNTABLE OPTICAL FIBER ENCLOSURE

CROSS-REFERENCE TO RELATED APPLICATIONS

This application claims the benefit of U.S. provisional patent application Ser. No. 61/934,932, filed Feb. 3, 2014, the entire contents of which are incorporated herein by reference.

FIELD OF INVENTION

The subject matter disclosed herein relates generally to rack mountable enclosures for managing optical fiber adapters, modules, connectors, and optical fiber cable itself.

BACKGROUND

Embodiments discussed herein relate generally to enclosures for cabling systems and in particular to a rack mountable enclosure that provides optical fiber cable patching. Cable management enclosures are used to terminate and distribute optical fiber cable for a variety of applications. One existing type of cable management enclosure is an optical fiber management enclosure, often employed to provide for managing optical fiber cables. The optical fiber cable density of such enclosures continues to grow as optical fiber adapters, optical fiber connectors and optical fiber modules reduce in size. Managing the large number of optical fiber cables and associated components, in a small area, can be difficult.

BRIEF DESCRIPTION OF THE DRAWINGS

Referring now to the drawings wherein like elements are numbered alike in the FIGURES.

DETAILED DESCRIPTION

Figure 1:
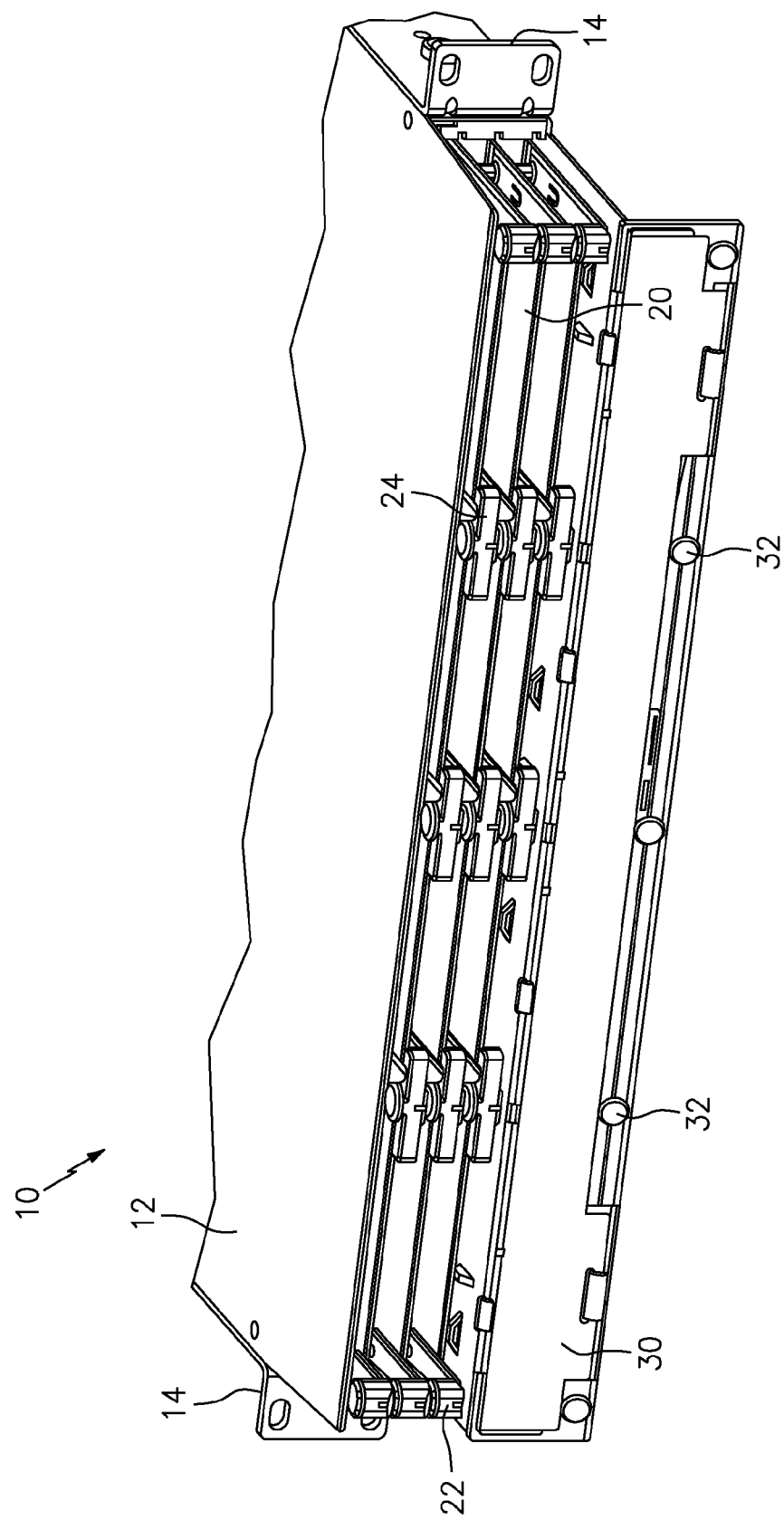
FIG. 1 is a perspective view of an optical fiber enclosure in an exemplary embodiment.

FIG. 1 is a perspective view of an optical fiber enclosure 10 in an exemplary embodiment. Optical fiber enclosure 10 includes a generally rectangular housing 12 having mounting tabs 14 on each side. Mounting tabs 14 are used to secure the optical fiber enclosure 10 to a rack, as known in the art. The optical fiber enclosure includes a plurality of trays 20 that support optical fiber adapters, optical fiber modules, etc. for mating with optical fiber connectors. Along the front edge of edge tray are a plurality of cable management clips 22 that organize and retain optical fiber cables entering the enclosure 10. The interior cable management clips include a pull tab 24 to facilitate extending a tray 20 forward. The exterior cable management clips 22 (on the left and right edges of tray 20) have no pull tab 24 so as to not interfere with housing 12.

A door 30 is hingedly connected to a bottom, front edge of optical fiber enclosure 10. In exemplary embodiments, the door 30 is magnetically latched closed. As shown in FIG. 1, door 30 includes at least one metal portion 32. The metal portion may be an integral part of the door 30 if the door is made from metal. Alternatively, the metal portion 32 may be a metal pad adhered to the door 30.

Figure 2:
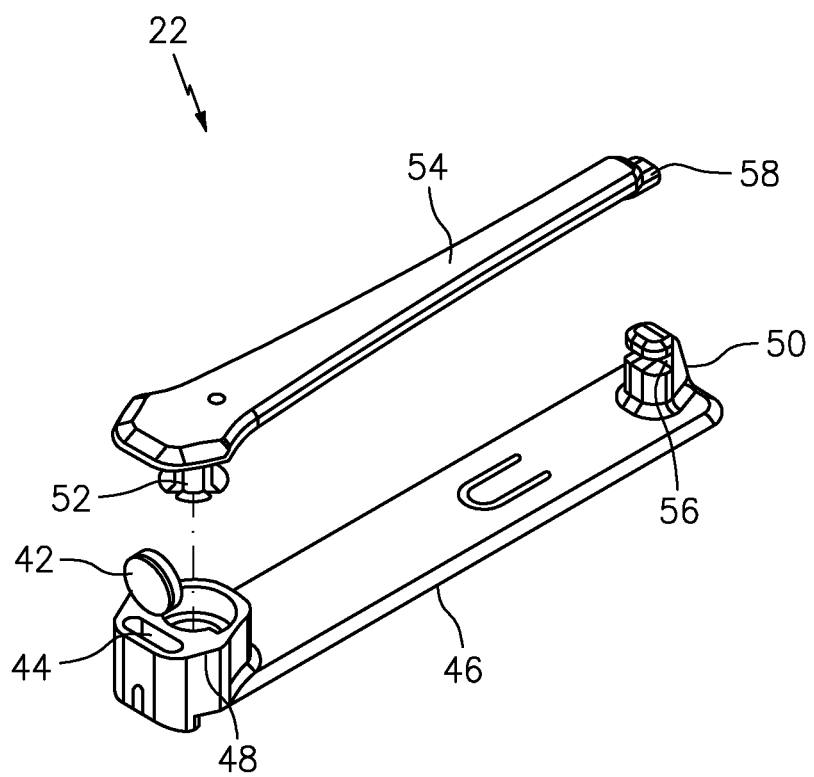
FIG. 2 is a perspective view of a cable management clip in an exemplary embodiment.
Figure 3:
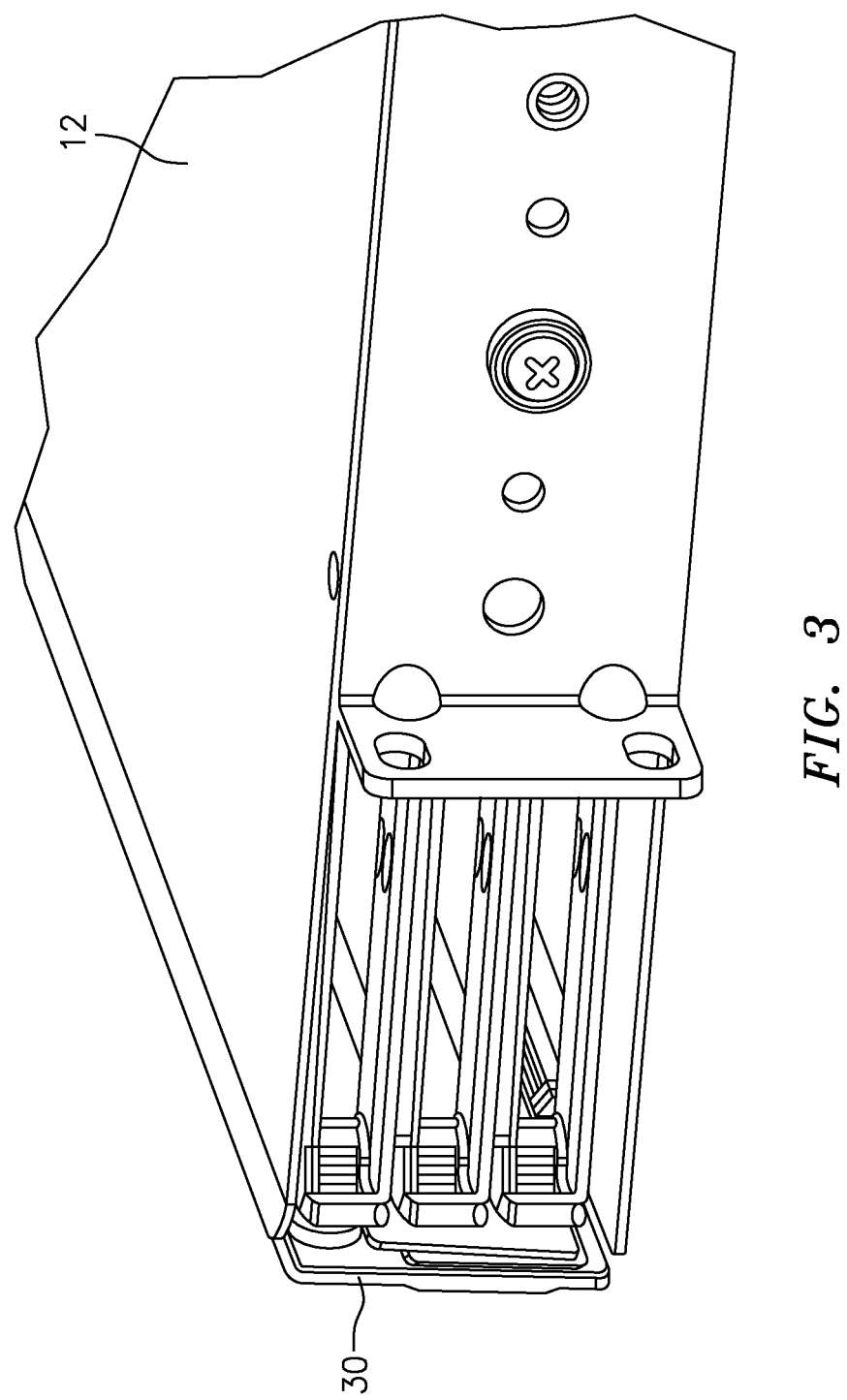
FIG. 3 is a perspective view of the optical fiber enclosure with the door closed in an exemplary embodiment.

FIG. 2 is a perspective view of a cable management clip 22 in an exemplary embodiment. The cable management clip 22 includes a magnet 42 that is received in a pocket 44 on a front face of the cable management clip 22. Placing the magnet in pocket 44 ensures that the magnet will not be damaged. Cable management clip 22 may be made from a non-conductive plastic. The metal portions 32 on door 30 and the magnets 42 in the cable management clips 22 coact to secure the door 30 closed. The use of a magnetic closing system provides several advantages. The magnetic closing removes potential pinch points if an optical fiber cable is out of place, because door 30 cannot be forced shut (unlike traditional enclosures with mechanical slam latches which can pinch optical fiber cables). Further, the door 30 opens automatically if there is pressure from the back, such as if a tray 20 were pushed forward. This eliminates damage to the optical fiber cable that could get caught in between the tray and the door. FIG. 3 is a perspective view of the fiber enclosure 10 with the door 30 closed in an exemplary embodiment.

Referring back to FIG. 2, the cable management clip 22 includes base 46 having a socket 48 at one end and a post 50 at the other end. Socket 48 has a generally cylindrical opening to receive a pin 52 formed on an arm 54. In this manner, arm 54 rotates relative to base 46 by the pivot connection provide by pin 52 and socket 48. Post 50 includes a groove 56 that receives an extension 58 on arm 54. Extension 58 may include a bump or detent to frictionally engage the interior of groove 56. The interaction of extension 58 and groove 56 keeps arm 54 parallel to base 46, or in a closed position.

Arm 54 and socket 48 may include one or more stop surfaces to control rotation of arm 54 relative to base 46. A tab may be formed adjacent post 50 that contact stop surfaces in socket 48. The tab and stop surfaces are positioned to limit rotation of arm 54 relative to base 46 to + or − about 90 degrees (e.g., 90 degrees clockwise and 90 degrees counterclockwise). This prevents arm 54 from extending beyond the front edge of tray 20 where arm 54 could be damaged or interfere with installation.

Figure 4:
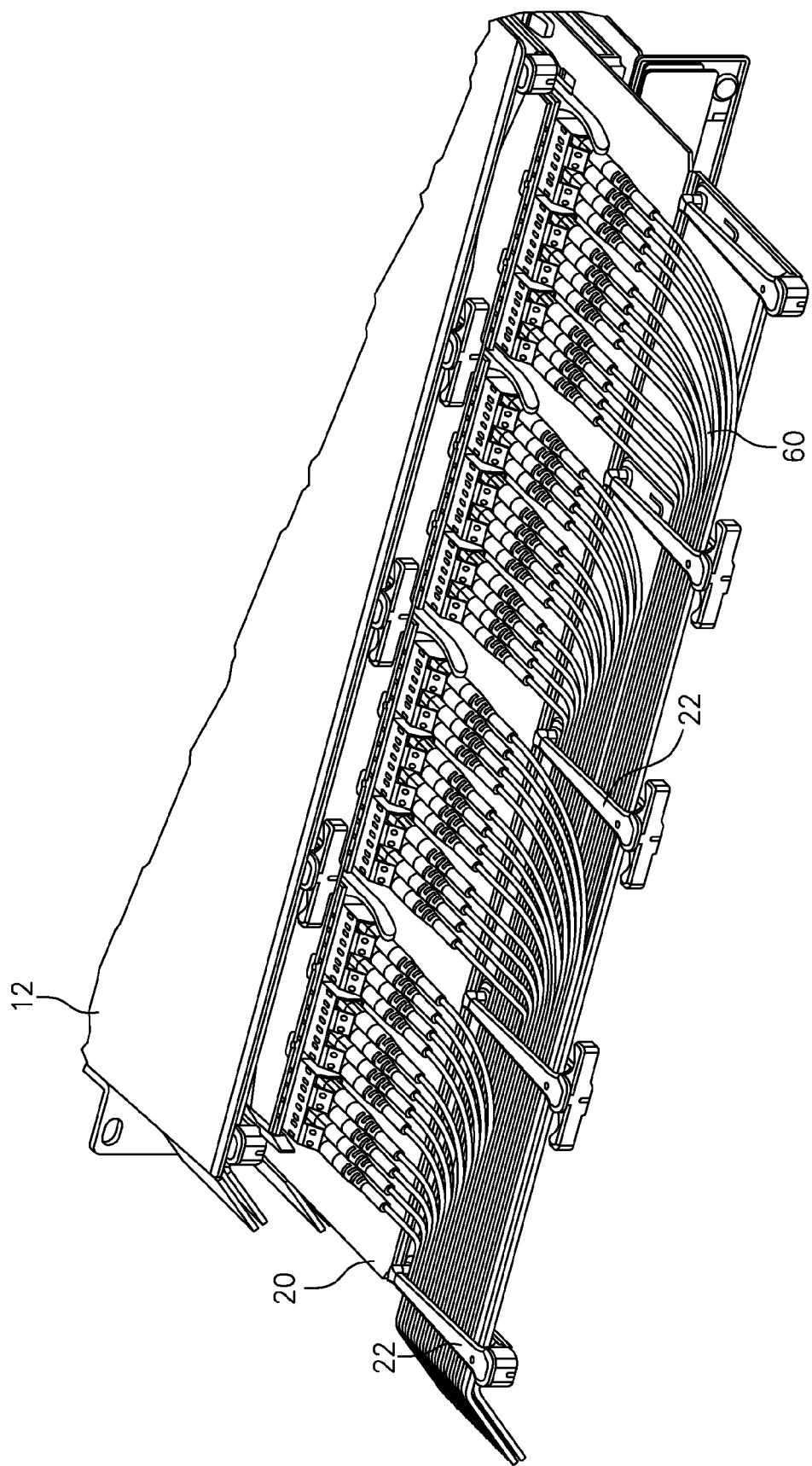
FIG. 4 is a perspective view of the optical fiber enclosure with a tray pulled forward.
Figure 5:
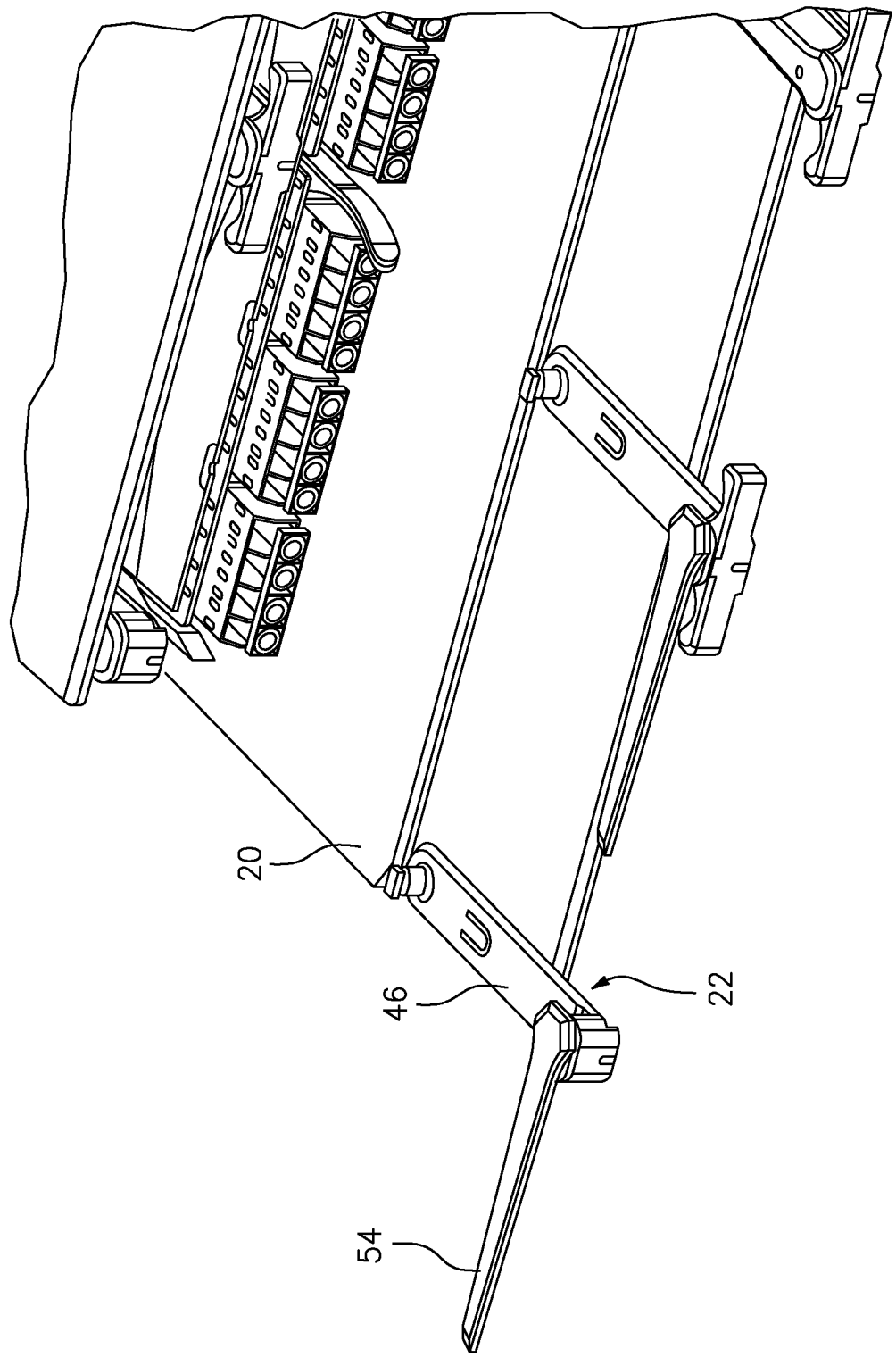
FIG. 5 is a perspective view of cable management clips on a tray in an exemplary embodiment.

FIG. 4 is a perspective view of the fiber enclosure with a tray 20 pulled forward of housing 12. The cable management clips 22 are in the closed position to retain optical fiber cables 60. As each cable management clip 22 can be individually opened, an installer can work on one section of optical fiber cables 60 without disturbing other optical fiber cables. FIG. 5 is a perspective view of tray 20 and cable management clips 22, showing cable management clips 22 in an open position, with arm 54 positioned to be out of parallel with base 46. The use of a plurality of cable management clips 22 along the front edge of tray 20 provides several advantages. Cable management clips 22 provide for management of high capacity of optical fiber cables. Cable management clips 22 swing open for full access to optical fiber cables. Cable management clips 22 provide the ability to access some optical fiber cables without rearranging the others. Cable management clips 22 are more accessible that traditional cable managers that require cable to be threaded through a slot.

Figure 6:
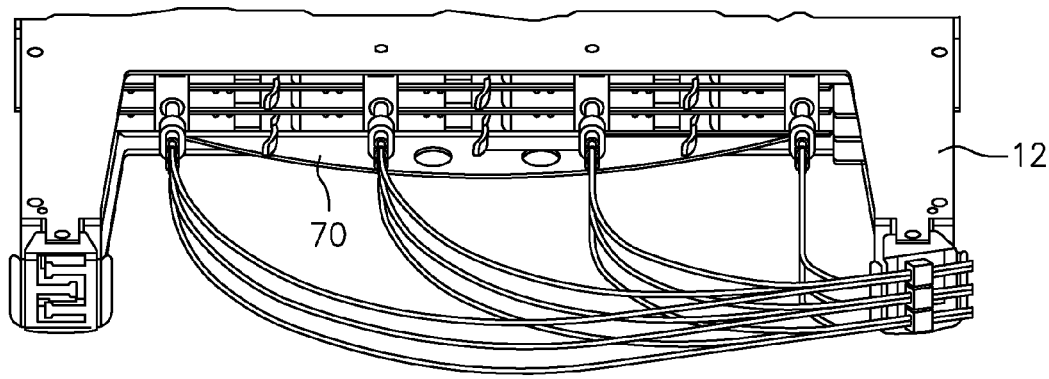
FIG. 6 is a perspective view of the optical fiber enclosure with a divider retracted in an exemplary embodiment.
Figure 7:
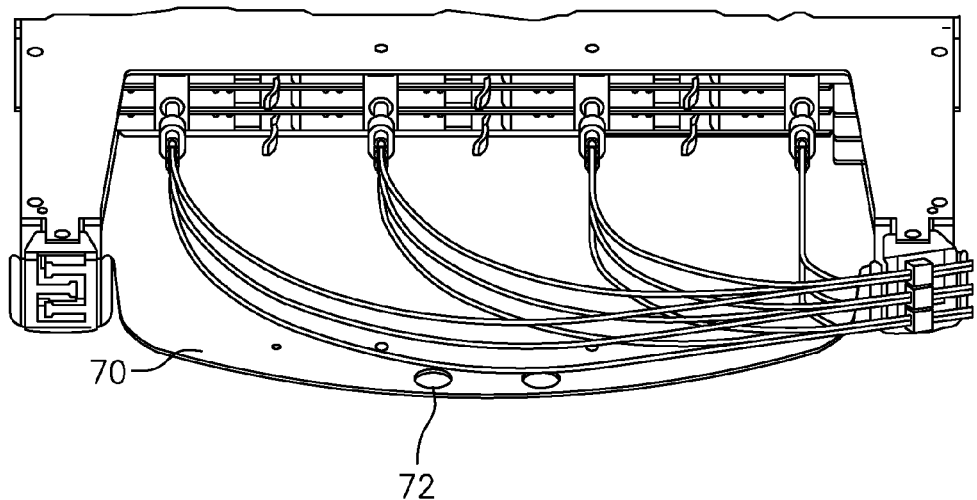
FIG. 7 is a perspective view of the optical fiber enclosure with the divider extended in an exemplary embodiment.

FIG. 6 is a perspective view of a rear side of the optical fiber enclosure with a divider 70 retracted into the housing 12 in an exemplary embodiment. FIG. 7 is a perspective view of the optical fiber enclosure with the divider 70 extending out from the rear side housing 12 in an exemplary embodiment. Divider 70 may be a planar element that is received in a bottom portion of housing 12, so as to not interfere with trays 20. One or more openings 72 may be formed in divider 70 to facilitate gripping the divider 70. When working on optical fiber connections at the rear of the enclosure, divider 70 may be extended to provide a work surface or labeling space. The divider 70 may also be extended away from the housing 12 to act as a cable partition between stacked optical fiber enclosures. When divider 70 is retracted, an installer can reach connections at the rear of the optical fiber enclosure.

Figure 8:
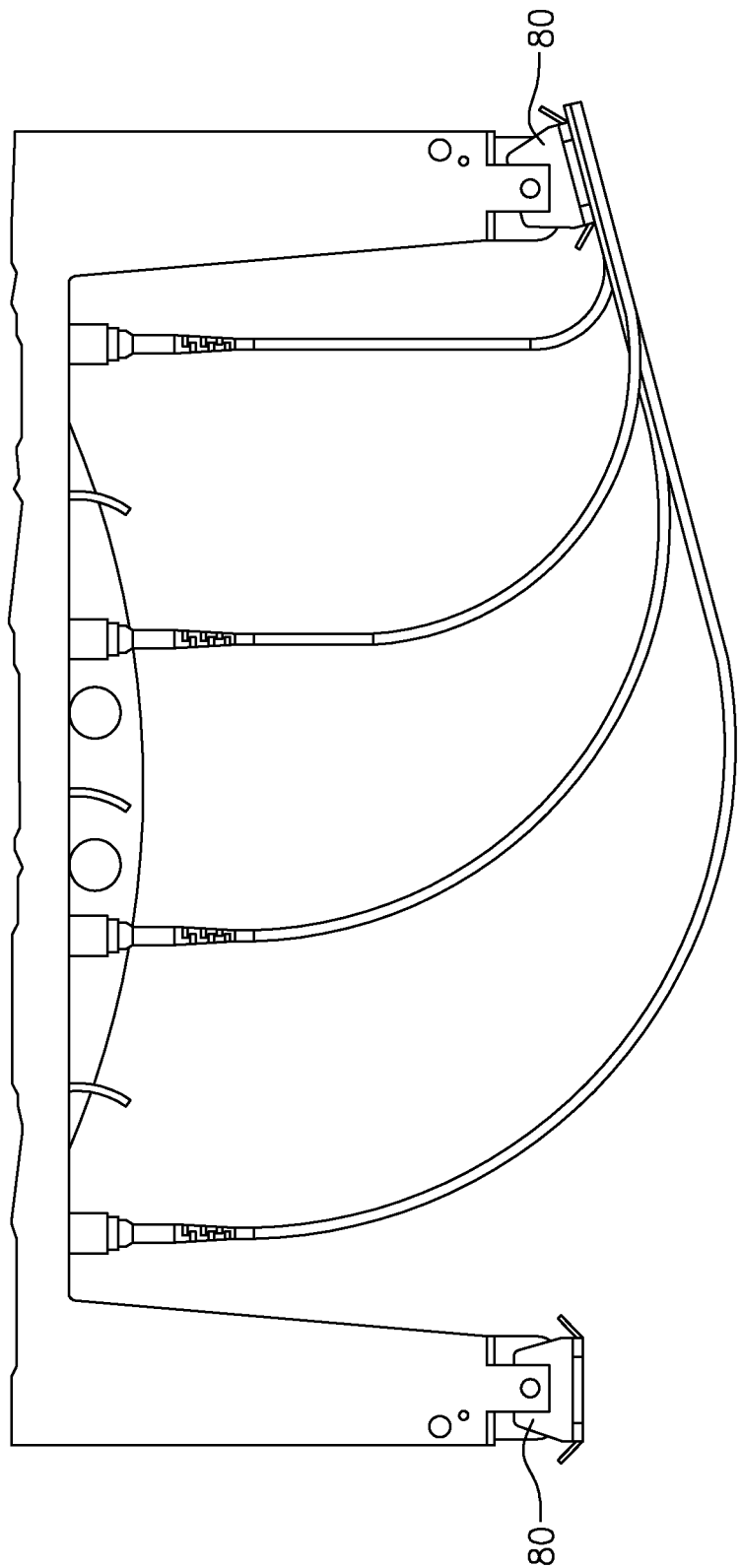
FIG. 8 is a top view of the optical fiber enclosure including pivoting cable managers in an exemplary embodiment.
Figure 9:
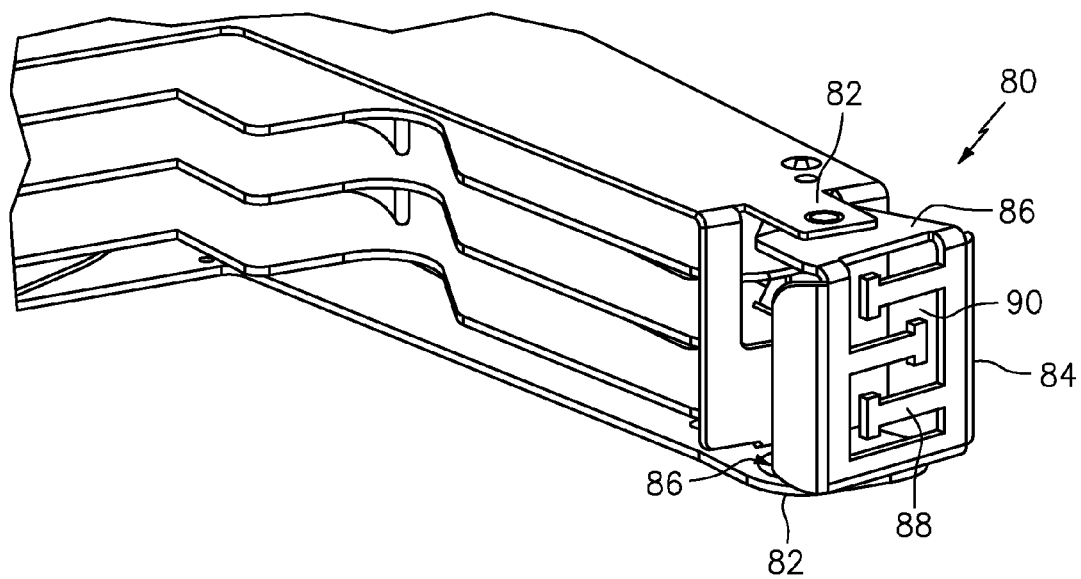
FIG. 9 is a perspective view of a pivoting cable manager in an exemplary embodiment.

FIG. 8 is a top view of the optical fiber enclosure including pivoting optical fiber cable managers 80 in an exemplary embodiment. FIG. 9 is a perspective view of a pivoting optical fiber cable manager 80 in an exemplary embodiment. The pivoting optical fiber cable manager 80 is pivotally mounted between two tabs 82 extending from a rear portion of housing 12. The pivoting optical fiber cable manager 80 includes a planar body 84 having two plates 86, generally perpendicular to body 84. Plates 86 are received between tabs 82 and pivotally secured to tabs 82. The pivotal securement may be provided by a detent or bump on plates 86 that is received in a corresponding opening or recess on tabs 82.

Figure 10:
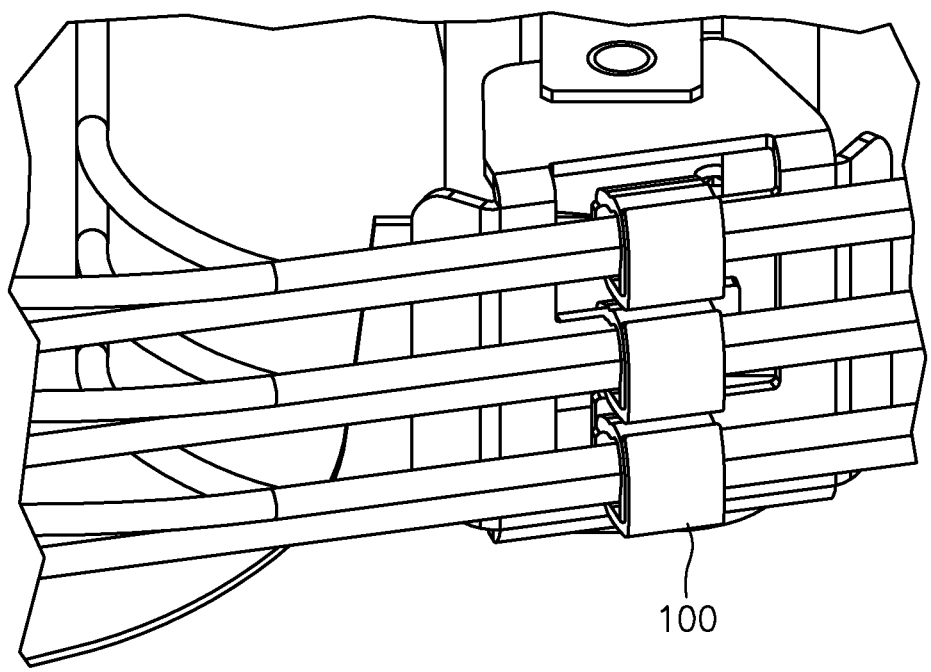
FIG. 10 is a perspective view of a pivoting cable manager with tie downs in an exemplary embodiment.
Figure 11:
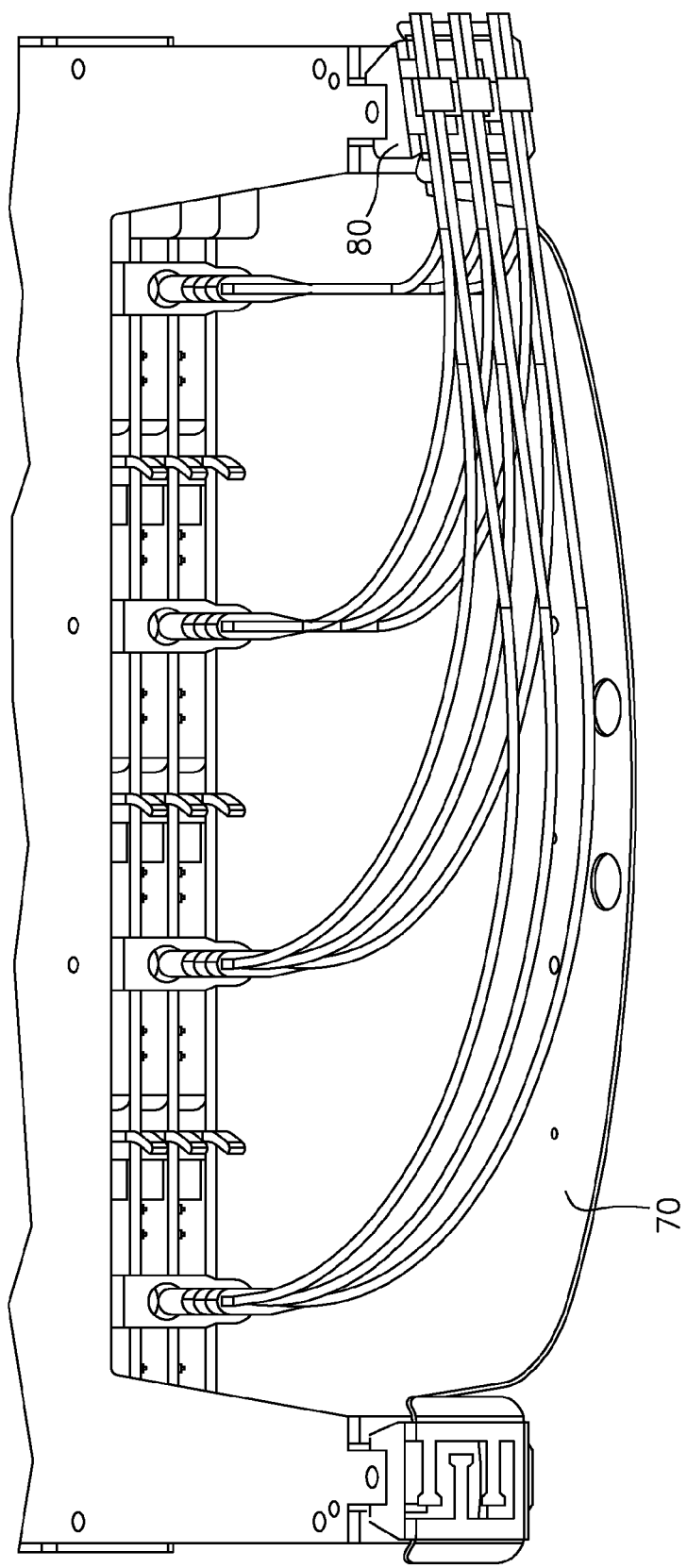
FIG. 11 is a perspective view of the optical fiber enclosure with the divider extended and pivoting cable managers in an exemplary embodiment.

Body 84 includes one or more prongs 88 positioned in an opening 90 in body 84. As shown in FIG. 10, the prongs 88 allow a cable tie down 100 (e.g., a hook and loop material tie down) to be wrapped around one or more optical fiber cables 60 and attached to prongs 88. FIG. 11 is a perspective view of the optical fiber enclosure with the divider 70 extended and pivoting cable managers 80 in an exemplary embodiment. Pivoting cable managers 80 employ swiveling tie down points, each of which providing a flexible tie down point for optical fiber cables. The pivoting cable manager 80 rotates as optical fiber cables are pulled by the installer. The pivoting cable manager 80 also rotates as enclosure trays 20 are slid in and out of housing 12. The pivoting cable manager 80 prevents the optical fiber cable from sharp bends to protect the optical fiber cable from damage.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description.

What is claimed is:

1. An optical fiber enclosure comprising:
a generally rectangular housing;
a plurality of trays slidable relative to the housing, the plurality of trays extendable from a front side of the housing; and
a plurality of cable management clips along a front edge of at least one tray of the plurality of trays, the cable management clips arranged to retain optical fiber cables entering the enclosure;
wherein at least one of the cable management clips includes a base having a socket at a first end and a post at a second end and an arm having a pin, the pin received in the socket to allow the arm to rotate relative to the base between an open position and a closed position.

2. The optical fiber enclosure of claim 1, wherein:
the plurality of cable management clips include interior cable management clips including a pull tab to facilitate extending the tray forward away from the housing.

3. The optical fiber enclosure of claim 1, wherein:
the post includes a groove to receive an extension on the arm.

4. The optical fiber enclosure of claim 3, wherein:
the extension frictionally engages the interior of the groove to secure the at least one of the cable management clips in a closed position.

5. The optical fiber enclosure of claim 1, wherein:
the at least one of the cable management clips includes a stop surface to limit rotation of the arm relative to the base.

6. The optical fiber enclosure of claim 1, wherein:
each of the plurality of cable management clips includes a base having a socket at a first end and a post at a second end and an arm having a pin, the pin received in the socket to allow the arm to rotate relative to the base between an open position and a closed position.

7. The optical fiber enclosure of claim 1, further comprising:
a divider contained within the housing, the divider extendable from a rear side of the housing opposite the front side of the housing.

8. The optical fiber enclosure of claim 7, wherein:
the divider is a planar element received in a bottom portion of the housing, so as to not interfere with the trays.

9. The optical fiber enclosure of claim 1, further comprising:
a door hingedly connected to an edge of the housing; and
a magnet to retain the door in a closed position.

10. The optical fiber enclosure of claim 9, wherein:
the magnet is received in a portion of at least one of the cable management clips.

11. The optical fiber enclosure of claim 1 further comprising:
at least one tab extending from a rear of the housing; and
a pivoting cable manager pivotally mounted to the at least one tab, the pivoting cable manager configured to rotate when at least one of the plurality of trays is slid in or out of the housing.

12. The optical fiber enclosure of claim 11, wherein:
the at least one tab include two tabs, the pivoting cable manager pivotally mounted between the two tabs.

13. The optical fiber enclosure of claim 11, wherein:
the pivoting cable manager includes a body having an opening therein and at least one prong extending into the opening, the prong to provide a location for a cable tie.

14. The optical fiber enclosure of claim 1, wherein:
the plurality of cable management clips are positioned along a front edge of each tray of the plurality of trays.

15. An optical fiber enclosure comprising:
a generally rectangular housing;
a plurality of trays slidable relative to the housing, the plurality of trays extendable from a front side of the housing; and a plurality of cable management clips along a front edge of at least one tray of the plurality of trays, the cable management clips arranged to retain optical fiber cables entering the enclosure;

wherein at least one of the cable management clips includes a base and an arm, the arm configured to rotate relative to the base between an open position and a closed position;

wherein one of the base and arm includes a socket and the other of the base and the arm includes a pin, the pin received in the socket to allow the arm to rotate relative to the base between an open position and a closed position.

* * * * *